Nov. 26, 1929.　　　　　E. A. ILEMAN　　　　　1,736,791
MOTOR OPERATED VALVE MECHANISM
Filed Sept. 18, 1926　　　2 Sheets-Sheet 1
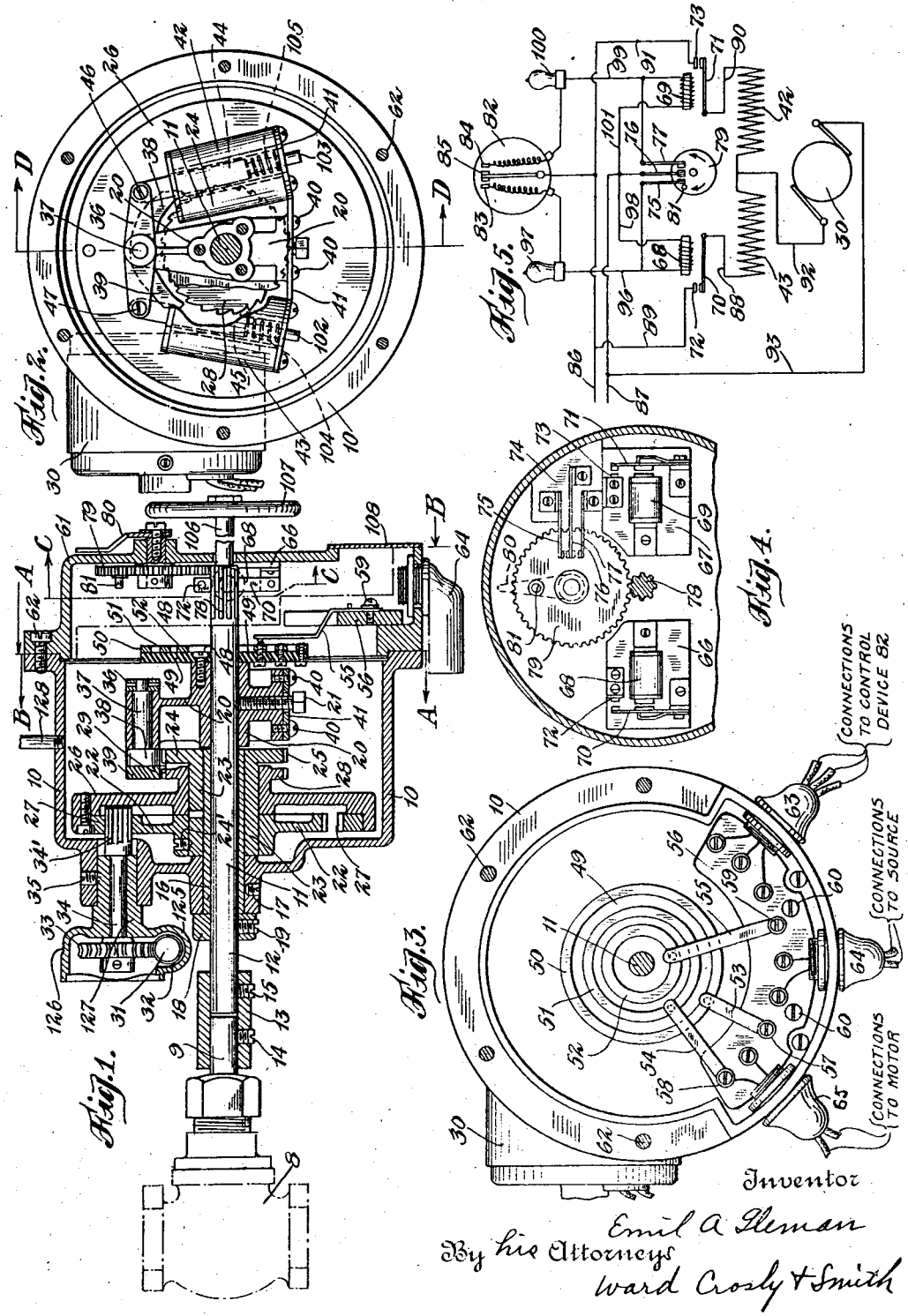

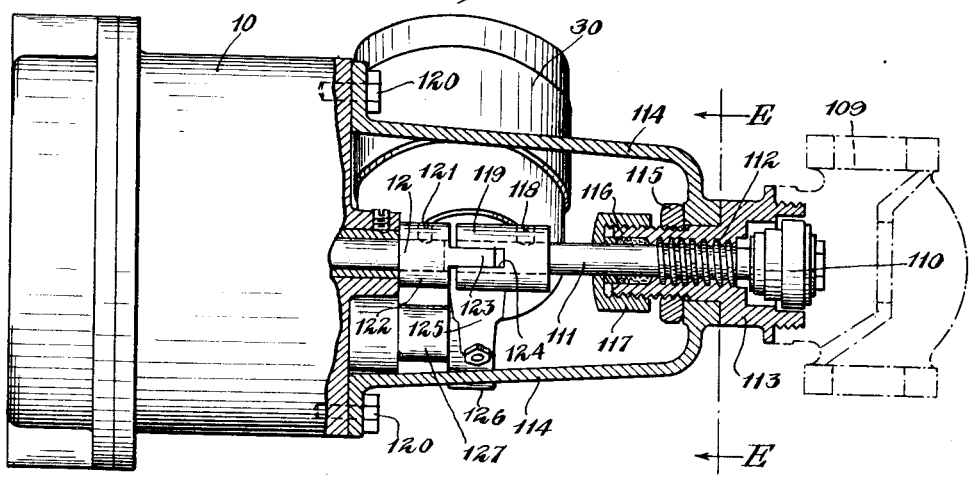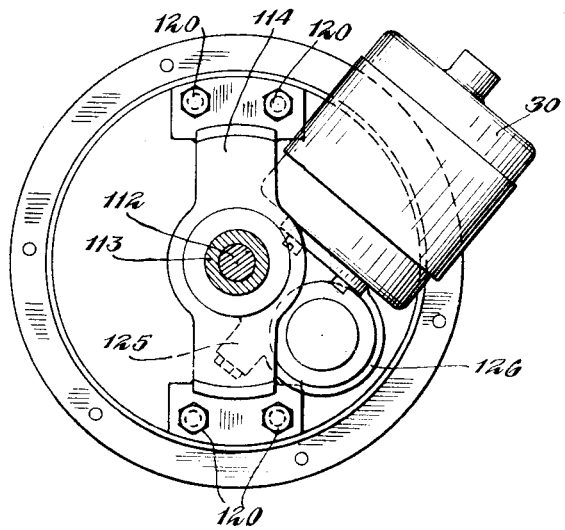

Patented Nov. 26, 1929

1,736,791

UNITED STATES PATENT OFFICE

EMIL A. ILEMAN, OF NEW YORK, N. Y., ASSIGNOR, BY MESNE ASSIGNMENTS, TO CONSOLIDATED ASHCROFT HANCOCK COMPANY, INC., OF NEW YORK, N. Y., A CORPORATION OF DELAWARE

MOTOR-OPERATED VALVE MECHANISM

Application filed September 18, 1926. Serial No. 136,365.

My invention relates more particularly to motor operated valve mechanism and I shall explain the invention in connection with a motor operated valve although my improvements will be found useful in other relationships and for operating or controlling various devices other than valves. The main object of the invention is to provide a motor operated mechanism which is not only simple and efficient in construction and operation, but also one which takes up little space and may be conveniently applied for the operation of a valve or other apparatus.

Further and more specific objects, features and advantages will more clearly appear from the detail description given below taken in connection with the accompanying drawings which form a part of this specification.

In the drawings Fig. 1 is a longitudinal section through a motor operated valve mechanism embodying my improvements in a preferred form thereof, this section being taken on the line D—D of Fig. 2, with certain parts omitted for the sake of clearness. Fig. 2 is a transverse section taken substantially on the line A—A of Fig. 1, the electrical contact slip rings being removed. Fig 3 is a transverse section taken substantially on the line B—B of Fig. 1. Fig. 4 is a transverse section taken substantially on the line C—C of Fig. 1. Fig. 5 is a wiring diagram. Fig. 6 is a side view partly in section showing a modified method of connecting the apparatus to a valve. Fig. 7 is a section taken on the line E—E of Fig. 6.

Referring to Figs. 1 to 4, 8 represents a valve and 9 the valve spindle, the rotation of which in one direction acts to close the valve and rotation of which in the opposite direction acts to open the valve. 10 represents a suitable casing in which is journaled a spindle 11, one end of which projects from the casing at 12 and is rigidly connected to the end of spindle 9 by means of a sleeve 13 and screws 14 and 15 so that turning of the spindle 11 will operate the spindle 9 and valve 8. The spindle 11 is adapted to rotate in a sleeve bearing 16 rigidly secured in the casing by screw 17. The spindle 11 is prevented from having axial movement in the casing by means of a shoulder member 18 secured to the spindle at one end by screw 19 and a spider 20 secured to the opposite end of the spindle at the opposite end of the sleeve 16 by means of a screw 21. 22 represents a gear having external teeth and freely rotatable on the sleeve 16 in the casing. For this purpose the gear 22 is rigidly secured to a sleeve 23 by screw 24'. The sleeve 23 extends longitudinally of the spindle 11 and sleeve 16 and at its other end is provided with a circular ratchet member 24 provided with ratchet teeth 25 on its periphery. 26 represents another gear having internal gear teeth 27 and freely rotatable about the sleeve 23 having integral therewith a circular ratchet member 28 having ratchet teeth 29 on its periphery.

30 represents an electric motor whose shaft 31 is provided with a worm 32 meshing with a worm gear 33 fixed to one end of a shaft 34. At its opposite end the shaft 34 is provided with a small integral gear 34', which meshes with the internal gear teeth on gear 26 and the external gear teeth on gear 22. The housing for the worm 32 and the worm gear 33 is made integral with the bearing for shaft 34 and this housing and bearing are rigidly secured to the motor casing in any suitable manner. The bearing for the shaft 34 is rigidly secured to the casing 10 by being inserted in an opening therein and secured in said opening by screw 35, so that by this means the motor and its casing are rigidly secured to and carried by the casing 10.

36 represents a rocker arm rigidly secured to a shaft 37 journaled in the spider 20. At its opposite end the shaft 37 has rigidly secured thereto two pawl members 38 and 39; pawl member 38 being adapted to engage the ratchet teeth at ratchet 24 and pawl member 39 being adapted to engage the ratchet teeth on ratchet member 28. Rigidly secured to the spider 20 by screws 40 is a bracket 41 and secured to the bracket 41 are two solenoids 42 and 43 arranged on opposite sides of the spindle 11. Arranged to slide freely within the solenoids 42 and 43 are magnetic core members 44 and 45 respectively and these core members are pivotally attached to the ends of rocker arm 36 at 46 and 47 respectively. Projecting from the free ends of the cores 44 and 45 are pins 102 and 103 respectively, these pins passing through apertures in the bracket plate 41. Coil springs 104 and 105 arranged about these pins 102 and 103 respectively exert pressure between the bracket 41 and the cores 45 and 44 respectively and so, when the solenoids 43 and 44 are deenergized, act to keep the arrangement in neutral position with both pawls 38 and 39 out of engagement with their respective ratchets.

Secured to the end of the spider 20 by screws 48 is a plate of insulating material 49. This plate of insulating material has a central aperture adapted to receive spindle 11. Arranged on this plate of insulating material are three electrical contact slip rings 50, 51 and 52. 53, 54, and 55 represent three spring contacts adapted to make frictional connection respectively with the contact rings 50, 51 and 52. 61 represents an end member or cap plate forming one end of the casing and secured to the main body of the casing by screws 62. Spring contact fingers 53, 54, and 55 are secured to a plate of insulating material 56 by screws 57, 58 and 59 respectively and the plate of insulating material 56 is secured to the cap member 61 by means of screws 60. The screws 57, 58 and 59 also serve as binding posts for making electrical connection to the spring contacts 53, 54 and 55 respectively. 63, 64 and 65 represent insulating bushings through which electrical connections may be passed from the outside to the inside of the casing.

On the inside of the cap member 61 are arranged two plates of insulating material 66 and 67 on which are fixed two electro-magnets 68 and 69 respectively. These electro-magnets are adapted to operate spring armatures 70 and 71 respectively, which are also carried by the insulating plates 66 and 67 respectively. Armature 70 is adapted to make electrical contact with contact 72 and armature 71 is adapted to make electrical contact with contact 73, contacts 72 and 73 being also carried by the insulating plates 66 and 67 respectively. 74 represents another plate of insulating material carried on the inside of the cap member 60 and secured to this plate of insulating material 74 are three spring contact fingers 75, 76 and 77. The end of the shaft or spindle 11 is cut to form a gear 78 and journaled in the cap member 61 is a gear 79 meshing with the gear 78, so that as the spindle 11 is turned to operate the valve, the gear 79 will be slowly turned in one or the other direction according as the valve is being opened or closed. On the outside of the cap member 61 there is an index pointer 80 secured to the axle of gear 79 so that it rotates with the same and the position of the index pointer 80 on the outside of the casing thus indicates the position of the valve, that is, to what extent it is opened or closed. Arranged on the face of the gear 79 is a pin 81, which when the valve is rotated in one direction and when the valve is substantially closed, will engage spring contact member 77 for example and cause it to make electrical contact with the central contact member 76. When the valve is being opened, the gear 79 will rotate in the opposite direction and when the valve has substantially reached its full open position the pin 81 for example will engage the spring contact finger 75 and cause it to make contact with the central contact member 76.

It will be seen that when the motor is operating, it will constantly rotate the gear 22 in one direction and the gear 26 in the other direction thereby rotating the ratchet member 24 constantly in one direction and the ratchet member 28 constantly in the opposite direction. If now the electro-magnet or solenoid 42 be energized, it will cause the pawl 38 to be brought into engagement with the ratchet 24 so that the latter will cause the pawl to be rotated with it and thereby cause the spider 20 and the spindle 11 to which it is secured to rotate in one direction, so as to operate the valve in one direction. If on the other hand the electro-magnet or solenoid 43 be energized, it will cause pawl 39 to be brought into engagement with the ratchet member 28 and so cause the pawl 39 to be rotated with it, thereby rotating the spider 20 and spindle 11 in the opposite direction and so cause the valve to be operated in the opposite direction.

Referring to Fig. 5, I there show a wiring diagram in which 82 represents mechanism adapted to control the electric circuit connections to the motor operated valve. For the mechanism 82 I preferably use an arrangement like that shown and described in my co-pending application Ser. No. 136,364 filed Sept. 18, 1926, but any other known or suitable mechanism may be used. As shown in Fig. 5 this mechanism is arranged with two fixed contacts 83 and 84 and a movable contact 85 therebetween adapted to make electrical connection with contact 83 or the contact 84 responsive to certain variations in pressure, temperature or other conditions. 86 and 87 represent electrical conductors connected to any suitable source of electrical energy for energizing the apparatus. Switch contact 72 is connected to conductor 86 by connection 89 and the other terminal of the switch is connected to the solenoid 43 by connection 88. Switch contact 73 is connected to the conductor 86 by connection 91 and the other terminal of the switch is connected to one terminal of the solenoid 42 by conductor 90, the other terminals of the solenoid 42 and 43 are connected together and to one terminal of the motor by connection 92. The other terminal of the motor is connected to the conductor 87 by connection 93. When magnet 68 is energized it closes relay switch 70, 72 and when magnet 69 is energized, it closes the relay switch 71, 73. One terminal of the magnet 68 is electrically connected to the contact 83 through a connection 96 and a light bulb 97. The other terminal of the magnet 68 is connected to the contacts 85 and 76 and conductor 87 through conductor 98. One terminal of the relay magnet 69 is connected to the electrical contact 84 through connection 99 and light bulb 100. The other terminal of the relay magnet 69 is connected to the conductor 87 and contacts 85 and 76 by connection 101. The switch contact member 75 is electrically connected to the connection 96 and the switch contact member 77 is electrically connected to the connection 99 as shown in the diagram.

Thus assuming a condition has been reached where it is desired to operate the valve in one direction so that contact 85 makes electrical connection with contact 83, this closes the circuit through the bulb 97 and relay magnet 68 thereby causing the switch 70, 72 to be closed so that the circuit through the solenoid 43 and the motor 30 is closed. This as above explained causes the motor to start operating and to continuously rotate the valve spindle so as to operate the valve in one direction. This operation will continue until contact is broken between 83 and 85 or until the gear 79 rotates to such a point that the pin 81 will cause connection to be made between contacts 75 and 76. This connection short-circuits the relay magnet 68 causing the switch 70, 72 to be opened thereby deenergizing both the solenoid 43 and the motor 30 so that the valve is prevented from being operated to an extent to cause the valve to bind.

If, however, conditions are such that the contact 85 makes connection with contact 84, this closes the circuit through the light bulb 100 and relay magnet 69, thereby causing the relay switch 71, 73 to close which causes the solenoid 42 and motor 30 to be energized thereby causing the valve spindle to be continuously operated in the other direction to operate the valve in the other direction. This operation will continue until the contact is broken between 84 and 85 or until the pin 81 on gear 79 causes the contact 77 to engage contact 76 whereupon relay magnet 69 becomes short-circuited and the switch 71, 73 will open, thereby deenergizing both the solenoid 42 and motor 30. The pin or pins 81 are made of such dimensions and so adjusted on the gear 79 that the same will cause contact to be made between contact 75 and 76 or between contacts 76 and 77, one when the valve has been substantially closed and the other when the valve has become substantially opened thereby deenergizing the motor when these positions are reached so that the motor does not continue to act to bind the valve in either open or closed position; that is, the same acts as a safety arrangement to deenergize the solenoids and motor when the valve reaches either of its extreme positions in case this is not accomplished by the opening of the connection between the contacts 83 and 85 or 84 and 85 as the case may be. By having the motor 30 in series with the solenoids 42 and 43, it is energized and deenergized at the same time that either one of these is energized and deenergized. Extending integrally from the spindle 11 is a spindle portion 106 to which is secured a hand wheel 107 whereby the spindle 11 and the valve may be turned manually to operate the same. The cap plate 61 may be provided with a suitable opening so that access may be had to the electrical connections on insulating plate 56 and this opening may be closed by a removable closure plate 108 (see Fig. 1).

Referring to Figs. 6 and 7 I there show a modified method of connecting the valve operating mechanism to the valve. 109 represents the valve, 110 the valve plunger having rigid therewith the valve spindle 111 provided with screw threads 112 co-operating with the internal screw threads in the bushing 113 which is screw-threaded in the valve member 109. Placed on a reduced portion of the bushing member 113 is a bracket member 114 and this is held on the bushing member 113 by nut 115. A suitable packing for the spindle 111 is shown at 116 held in place by a cap nut 117 through which the spindle 111 passes. Rigidly secured to the spindle 111 by screw 118 is a slotted member 119. The casing 10 containing the electrically operating apparatus as above described, is rigidly secured with respect to the valve casing by being secured to the bracket frame 114 by bolts 120. To the end of the spindle 12 of the electrically operated apparatus, there is rigidly secured by screw 121 a sleeve member 122 provided with an integral tongue 123 which is adapted to slidably engage the slot 124 in the member 119. Thus as the spindle 11, 12 is turned it will turn the sleeve 122 with its tongue 123 which in turn will turn the member 119 and the valve spindle 111. By reason of the fact that the tongue 123 is slidably received in the slot 124, the spindle 111 may move inwardly and outwardly and axially of the spindle 11, 12, as the valve is operated without necessitating such similar movement of the valve spindle 11. As shown in Figs. 6 and 7 the motor is indicated at 30 and its shaft 31 and the worm 32 are encased in the housing portion 125 while the worm gear is encased in the housing portion 126 and the shaft 34 of the worm gear 33 is encased in the housing portion 127, the housing portions 125, 126 and 127 being integral or rigidly fixed together and secured in a boss on the casing 10 by screw 35 as shown in Fig. 1.

It will be noted that in the arrangement shown in Figs. 6 and 7 the casing 10 is rigidly secured in place by being secured to the valve housing. In the arrangement shown in Fig. 1, however, there is no axial relative movement between the spindles 11 and 9 since these two spindles are rigidly connected together, and the casing 10 and the parts contained therein are entirely supported by the rotating spindles. In order to prevent the casing from rotating with the spindles any suitable means may be employed such for example, as an anchor member 128 (see Fig. 1) comprising a rod screwed into the side of the casing and extending to some fixed portion of the installation or building in which the apparatus is located.

From the above it will appear that I have provided an extremely simple and efficient arrangement for operating the valve or other mechanism by an electric motor responsive to various conditions as controlled by the controlling device 82 and that the arrangement is extremely compact and self-contained by reason of the arrangement described. However, many changes and modifications may be made and the invention embodied in widely different forms and for other purposes without departing from the invention in its broader aspects. Hence I desire to cover all modifications, changes and forms coming within the language or scope of any one or more of the appended claims.

What I claim as new and desire to secure by Letters Patent is:

1. The combination of a spindle to be rotated, a casing, a motor carried by the casing, a spindle in the casing, means connecting said spindles whereby rotation of the second spindle will rotate the first spindle, an internal gear and an external gear in the casing and both rotatable about the second spindle as an axis, a worm driven by the motor, a worm gear driven by the worm, a gear driven by said worm gear and meshing with said external and internal gears whereby one is driven in one direction and the other is driven in the opposite direction, ratchets carried by said external and internal gears respectively, a spider in the casing and rigidly secured to the second spindle, two pawls secured together and pivotally mounted on said spider, two electro-magnets mounted on the spider, means whereby one magnet causes one pawl to engage one ratchet and means whereby the other magnet causes the other pawl to engage the other ratchet.

2. The combination of a shaft to be rotated, two gears rotatable about said shaft, means rotating said gears in opposite directions about said shaft, two ratchet members rotated about said shaft in opposite directions by said gears respectively, two electromagnets rotatable with shaft, pawls rotatable with the shaft and adapted to engage said ratchets respectively and means whereby said electromagnets control the operation of said pawls respectively.

3. The combination of a shaft to be rotated, two ratchet members rotatable about said shaft, means for so rotating said ratchet members in opposite directions, a frame member rigidly secured to the shaft, two pawls carried by the frame and adapted to engage said ratchet members respectively, and two electromagnets also carried by said frame and controlling the operation of said pawls respectively.

4. The combination of a shaft, an internal gear and an external gear rotatable about the shaft, a motor, a worm driven by the motor, a worm gear driven by the worm, a gear driven by said worm gear and meshing with said external and internal gears, ratchets carried by said gears respectively, a spider secured to the shaft, two pawls carried thereby, two electromagnets carried by the spider and means whereby one magnet causes one pawl to engage one ratchet and the other magnet causes the other pawl to engage the other ratchet.

5. The combination of a shaft to be rotated, two ratchet members rotatable about said shaft, means for so rotating said ratchet members in opposite directions, a frame member rigidly secured to the shaft, two pawls secured together and pivotally mounted on the frame member, two electromagnets mounted on the frame member, and means whereby one magnet causes one pawl to engage one ratchet and the other magnet causes the other pawl to engage the other ratchet.

In testimony whereof I have signed my name to this specification.

EMIL A. ILEMAN.